(12) United States Patent  
Albrecht et al.

(10) Patent No.: US 7,891,379 B2
(45) Date of Patent: Feb. 22, 2011

(54) MECHANICAL FASTENING AND LOCKING OF STRUCTURAL, FLUID, AND ELECTRICAL COMPONENTS AND SYSTEMS

(76) Inventors: David E. Albrecht, 1383 Granary Rd., Blue Bell, PA (US) 19422; David E. Albrecht, Jr., 5301 Parade Field Way, Lansdale, PA (US) 19446

( * ) Notice: Subject to any disclaimer, the term of this patent is extended or adjusted under 35 U.S.C. 154(b) by 788 days.

(21) Appl. No.: 11/770,145

(22) Filed: Jun. 28, 2007

(65) Prior Publication Data

US 2009/0000679 A1    Jan. 1, 2009

(51) Int. Cl.
    *F16B 37/00*  (2006.01)
(52) U.S. Cl. .................. 137/884; 411/178; 411/383
(58) Field of Classification Search ............... 137/884; 411/108, 111, 112, 113, 215, 178, 383, 384, 411/389, 966
    See application file for complete search history.

(56) References Cited

U.S. PATENT DOCUMENTS

| | | | | |
|---|---|---|---|---|
| 2,401,824 | A | * | 6/1946 | Gladden et al. ............ 411/113 |
| 3,079,970 | A | * | 3/1963 | Barry ...................... 411/113 |
| 3,596,656 | A | | 8/1971 | Kaute |
| 4,557,650 | A | * | 12/1985 | Molina .................... 411/108 |
| 4,848,405 | A | | 7/1989 | Albrecht |
| 4,934,411 | A | | 6/1990 | Albrecht |
| 5,087,795 | A | | 2/1992 | Guginsky |
| 5,415,510 | A | * | 5/1995 | Funaki et al. .............. 411/384 |
| 5,746,561 | A | * | 5/1998 | Nygren et al. ............. 411/368 |
| 5,860,779 | A | * | 1/1999 | Toosky et al. ............. 411/432 |
| 6,109,849 | A | * | 8/2000 | Nagayama ................. 411/181 |
| 6,350,094 | B1 | | 2/2002 | Shiokawa |
| 6,439,816 | B1 | * | 8/2002 | Nance et al. .............. 411/108 |
| 6,763,848 | B2 | * | 7/2004 | Rondreux et al. .......... 137/269 |
| 7,296,957 | B2 | * | 11/2007 | Walter et al. .............. 411/175 |
| 7,464,726 | B2 | * | 12/2008 | Mertes et al. ............. 137/884 |
| 2001/0005473 | A1 | | 6/2001 | Shiokawa |
| 2002/0147499 | A1 | | 10/2002 | Shea |
| 2009/0053006 | A1 | | 2/2009 | Hufnagi |

OTHER PUBLICATIONS

Office Action U.S. Appl. No. 11/770,192.
Office Action U.S. Appl. No. 11/770,169.

* cited by examiner

*Primary Examiner*—John Fox
(74) *Attorney, Agent, or Firm*—Muskin & Cusick LLC

(57) ABSTRACT

A stack or assembly of fluid, mechanical, and/or electrical components permits removal of some components for maintenance, without compromising the fluid integrity of the remainder of the assembly. A fastening bolt, attached to at least one fluid component, is screwed into a stacking bolt, attached to another fluid component, the bolts being screwed together inside the bore of an adapter plate. A resilient insert sits between the head of the stacking bolt and the bore. At least a portion of the bore has a continuous taper, such that the diameter of the bore decreases in the vicinity of the insert. The taper creates a reduced diameter hole on one surface of the adapter plate, thus preventing interference between fluid ports on an adjacent fluid component. The taper also prevents loss of the insert during transportation and storage, and prevents undesired extrusion of material of the insert when the components are fastened together.

18 Claims, 18 Drawing Sheets

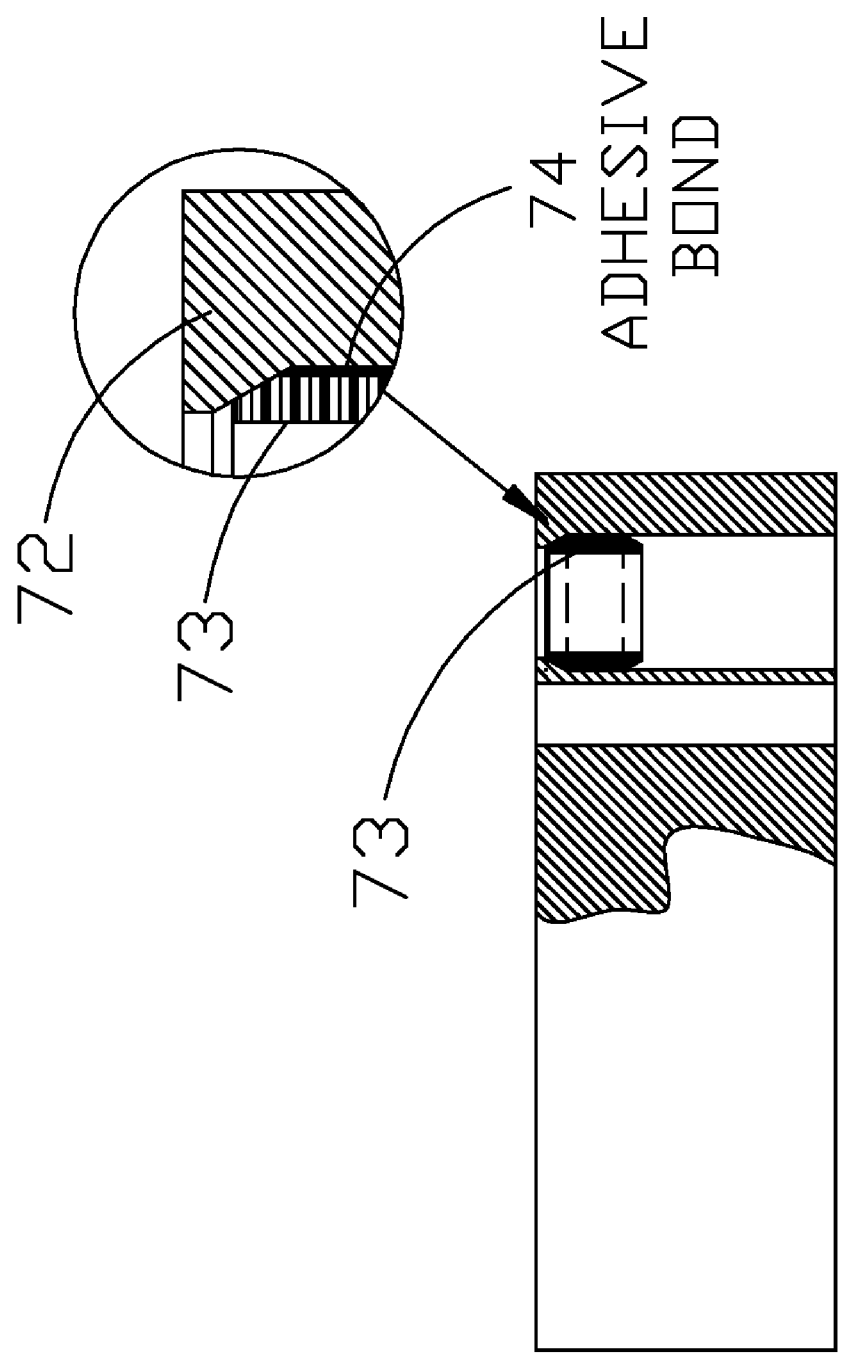

MECHANICAL FASTENING AND LOCKING OF STRUCTURAL, FLUID, AND ELECTRICAL COMPONENTS AND SYSTEMS

BACKGROUND OF THE INVENTION

This invention relates to an improved means of joining, or stacking, a plurality of structural, fluid, and/or electrical components. The invention can be used, in one example, to assemble components of a hydraulic control system.

Hydraulic control systems typically include a combination of fluid components, such as valves, actuators, pumps, and the like. The function of a particular hydraulic system is determined not only by the operation of the individual components, but also by their sequence or arrangement with respect to the flow path of fluid.

A control system is typically positioned between the source of the pressurized fluid (such as a pump), and the actuator that does the work (such as a linear cylinder or rotary motor). The control system dictates how the pressurized fluid will behave at the actuator, i.e. when the actuator will see pressurized fluid, at what pressure, how fast this pressure will ramp up or ramp down, at what flow rate, whether the flow will be constant or variable, in what direction the fluid will flow, etc.

Valve stacks have been a popular means of organizing the valves in a control system. Valve functions are separated and placed in their own body or envelope. These envelopes have opposing surfaces machined in a manner that allows fluid communication between them. Traditionally, these envelopes are stacked on a particular station of a manifold, with each station dedicated to a particular actuator. Thus, a four-station manifold would divide and control the fluid flow to four separate actuators.

The flow of fluid may be a round trip from the manifold, through the lowest valve element in the stack to the highest, and back again to the manifold, with each valve in the stack performing a particular function along the way. Separate channels would be provided in each valve element.

In practice, the last valve in a stack has often been a solenoid operated directional control valve. The other valves in the stack would be sandwiched between the directional control valve and the manifold.

The above-described stack configuration has significant problems. Long bolts or tie rods have been used to hold the components of a stack together, keeping them firmly abutted against their corresponding position on the manifold. For stacks containing many valve elements, this arrangement is problematic, as stretching of the bolt or tie-rod could cause the mating surfaces of adjacent valve envelopes to separate and leak. Also, the labor required in sizing and cutting thread stock for tie rods is considerable.

Stacking bolts have been used in the past to address the above problems. In a typical arrangement, a stacking bolt includes a head which has been hollowed and threaded, so that a fastening bolt, connected to a component above the first, could be screwed into the threaded portion of the stacking bolt. In principle, the system could include a series of bolts, each bolt being screwed into the head of an adjacent bolt. In effect, one replaces a long bolt or tie rod with a sequence of shorter bolts, each one being screwed to an adjacent bolt.

Stacking bolts have their own disadvantages, however, especially when a stack needs to be taken apart for servicing. The need for such servicing is common. For example, the electrical solenoid of a solenoid-operated directional control valve is prone to failure due to misapplication, and the solenoid often must be replaced. As this valve element is often the last in a stack, theoretically replacing the solenoid operated directional control valve should not be difficult. However, with the use of multiple stacking bolts in series, one is never certain which threaded connection in the series will loosen. When one unscrews the top bolt in the stack, it may not necessarily be the last set of stacking bolts associated with the directional control valve that loosens, but rather a bolt or bolts further down in the stack. This effect can cause leakage after the stack has been reassembled.

In recent years, larger manifolds that contain all the valve elements as cartridges have replaced stacks. Such a manifold comprises one monolithic piece of aluminum, steel, or cast iron. Each valve element is represented by a cartridge that is threaded into this manifold, and any cartridge may be removed for servicing, individually, without disturbing any other valve element. Although this type of monolithic manifold does solve the problems of stacked valve elements as described above, it can be quite expensive to design, and is not practical in short production runs where the engineering and machine set-up time can only be amortized over a few items. Thus it is not practical for prototype machines, or specialized or short production run machinery.

Furthermore, the design and machining of the above-described manifolds can be quite challenging. The design of complex manifolds often requires solid modeling software and experienced solid modeling engineers. The machining must be accomplished on very expensive numerically controlled four and five axis machining centers. Moreover, a machining error on the very last hole or cavity of the manifold can render the entire manifold scrap.

The flow paths within the above-described manifolds can be quite convoluted, with narrow bores having compound angles often necessary to connect the appropriate portions of the cartridge type valve elements. The pressure drops through these flow paths can be high, and often a large amount of potential work within the hydraulic fluid is wasted as heat.

Thus, in many circumstances, a valve stack arrangement is preferable to a monolithic manifold assembly.

A solution to some of the above-described problems with valve stack arrangements is provided by U.S. Pat. Nos. 4,848, 405 and 4,934,411, the disclosures of which are incorporated by reference herein. Briefly, U.S. Pat. No. 4,848,405 describes an adapter plate within which a fastening bolt screws into the head of a stacking bolt below it. A resilient insert is located within the bore in the adapter plate, at the location where the bolts are screwed together. The insert causes the stacking bolt to be tightly held in a given position, such that when the fastening bolt is unscrewed, the torque exerted in unscrewing the fastening bolt does not cause rotation of the stacking bolt below. In effect, the insert stabilizes each joint, preventing unintended turning of bolts in the stack.

But the above-described solution has disadvantages. First, it is generally not compatible with mounting patterns made according to industry standards for directional control valves. The stacking arrangements of the prior art were conceived to be used with SAE, square, or other standard flange, tube, pipe, or hose mounting patterns, but not with industry standard directional control valve patterns where the distance between the bolt holes and the fluid channels are lessened. Generally, solenoid operated directional control valves used in valve stacks as described above are provided with industry standard fluid channel patterns (for example, D03, D05, etc.). These standards are delineated in ANSI/B93.7M-1986, entitled Hydraulic Fluid Power-Valves-Mounting interfaces. Each standard interface is defined by a group of fluid channel diameters and locations (i.e. pressure, tank, the work ports A and B, and pilot channels x and y), as well as mounting hole and locating pin locations and thread specifications.

The method of stacking described in the above-cited patents is not compatible with the above-mentioned industry standard valve-mounting interfaces. The enlarged bore portion of either the main body or the adapter portion that accommodates both the wrenching portion (i.e. the head) of the stacking bolt and the rotation resisting insert is of such a size that it interferes with either the locating pin, or comes unacceptably close to an O-ring cavity of a fluid port. There are literally millions of valves with these mounting interfaces in use today that are not compatible for use with the stacking systems of the above-cited patents.

Achieving such compatibility is not simply a matter of decreasing the outside diameter of the rotation-resisting insert. Doing so results in an insert that is too thin for the amount of deformation required to hold the stacking bolt firmly against rotation. Furthermore, the amount of deformation required in a thinner insert may result in permanent deformation of the insert and impair the ability to re-use the insert.

The solution proposed in U.S. Pat. No. 4,848,405 presents additional difficulties. The interior surface of the insert described above is keyed to the outside of the stacking bolt, and the polar orientation of the stacking bolts are unknown prior to installation. For this reason, the insert is provided as a separate piece from the adapter, with no reliable means for keeping it together with the adapter during shipping. Thus, an insert of this kind is frequently lost during transportation or handling.

Still another problem with the above solution is the difficulty of pressing the adapter plate onto the insert, while the insert is installed around the head of the stacking bolt. The insert is intentionally designed such that its outer diameter exceeds the inner diameter of the bore within which it is intended to sit, to insure a tight fit. But this tightness makes it very difficult to install the plate over the insert. An ideal solution to this problem is to use the fastening bolts, associated with the fluid component immediately above the adapter, as a jack. That is, one tightens the adapter plate by screwing the fastening bolt into the stacking bolt, and this tightening action forces the adapter plate into abutment with the fluid component below. However, this approach is generally not effective, because the fastening bolt is almost never long enough to serve adequately as a jack.

Still another problem with the use of the resilient insert described above is its tendency to become extruded when wedged between the head of the stacking bolt and the bore of the adapter plate. In particular, the material defining the insert sometimes becomes extruded upward, interfering with the seal between the adapter plate and the directional control valve (or other fluid component) located above the adapter plate. This effect ultimately leads to leakage of hydraulic fluid.

The present invention comprises an improvement to the stacking arrangement described above, and solves the above-mentioned problems. The invention may be used with standard hydraulic fluid power valve mounting interfaces. In addition, it may be used with SAE, square or other standard mounting patterns, and due to its advantages, it may be preferable for use with these patterns as well. More generally, the invention can be used in assembling many combinations of mechanical, hydraulic, and electrical components.

SUMMARY OF THE INVENTION

The present invention comprises an assembly of structural, fluid, and/or electrical components.

In one preferred embodiment, the invention comprises a stack of fluid components, wherein the stack includes a component having a stacking bolt, and a component having a fastening bolt, the fastening bolt being capable of being screwed into a hollowed head of the stacking bolt. The connection of the bolts is accomplished within the bore of an adapter plate. A resilient, annular insert is attached to the head of the stacking bolt, and therefore occupies the space between the head and the bore, thus preventing rotation of the stacking bolt when the fastening bolt is turned. At least a portion of the bore of the adapter plate is tapered, such that the diameter of the bore at or near the superior surface of the adapter plate is less than the diameter of the bore at or near the inferior surface. The insert has corners having a chamfer, the chamfer defining an incline having an angle which is is the same as, or approximately the same as, the angle made by the taper of the bore, in the vicinity of the superior surface, the angle being relative to the axis of the bore.

The above-described arrangement tends to prevent the insert from becoming lost during transportation or storage, because the insert can be wedged into the reduced diameter region of the bore produced by the taper, and tends to remain in this position due to friction. Also, as this reduced diameter region is located near the superior surface of the adapter plate, this construction tends to prevent upward extrusion of the material of the insert during assembly of the stack.

As noted above, due to the reduction in diameter effected by the taper, the hole in the superior surface of the adapter plate has a smaller diameter than the corresponding hole on the inferior surface. In particular, the hole on the superior surface is smaller than that provided in the industry standard patterns used in the prior art. Therefore, this arrangement prevents interference between fluid components, while still allowing the adapter plate to be used with fluid components having industry standard directional control valve mounting patterns.

The invention also includes a stacking kit, which can be used to form stacks of fluid components made according to the prior art. The kit includes the adapter plate as described above, one or more resilient inserts, and one or more stacking bolts.

The present invention therefore has the primary object of providing an assembly of structural, fluid, and/or electrical components, wherein components of the assembly can be easily removed for maintenance or replacement, without compromising the integrity of the other components of the assembly.

The invention has the further object of providing a stack of components, as described above.

The invention has the further object of providing an adapter plate for use in constructing a stack or assembly of components, the adapter plate having structure for assuring the integrity of seals in the assembly when the assembly is disassembled.

The invention has the further object of providing an improved stack or assembly having a resilient insert for locking the position of a stacking bolt, wherein the insert is unlikely to be lost, dislodged, or misplaced during transportation or storage.

The invention has the further object of providing a stacking kit for the stacking of conventional fluid components.

The invention has the further object of improving the efficiency and reliability of stacks or assemblies comprising structural, fluid, and/or electrical components.

The invention has the further object of enhancing the integrity of stacks of structural, fluid, and/or electrical components.

The invention has the further object of preventing leakage in stacks of fluid components, due to disassembly of such stacks for maintenance or for other purposes.

The invention has the further object of reducing or eliminating the labor required in sizing and cutting tie rods or thread stock.

The reader skilled in the art will recognize other objects and advantages of the present invention, from a reading of the following brief description of the drawings, the detailed description of the invention, and the appended claims.

BRIEF DESCRIPTION OF THE DRAWINGS

FIG. 9 shows a manifold used with a directional control valve. FIG. 10 shows a valve attached to the manifold. FIG. 11 shows an adapter plate being inserted atop the valve. FIG. 12 shows a directional control valve installed over the adapter plate, but wherein the adapter plate has not yet been brought into abutment with the valve below. FIG. 12A illustrates the condition wherein the components have all been brought into full abutment.

FIG. 14 provides a cross-sectional view, and a detail, showing the adapter plate of the present invention, in which the outside diameter of the insert is essentially the same as the diameter of the bore in the adapter plate.

DETAILED DESCRIPTION OF THE INVENTION

The present invention provides means for mechanical fastening and locking of assemblies comprising structural, fluid, and/or electrical components. One such assembly comprises a stack of components. In the following description, the embodiment described in the most detail will be a stack of fluid components. However, it should be understood that the invention is not limited to use exclusively with stacks of fluid components or other components, and that the concept of the invention can be broadly applied to assemblies having components which are mechanical, electrical, and/or hydraulic in nature.

Figure 3:
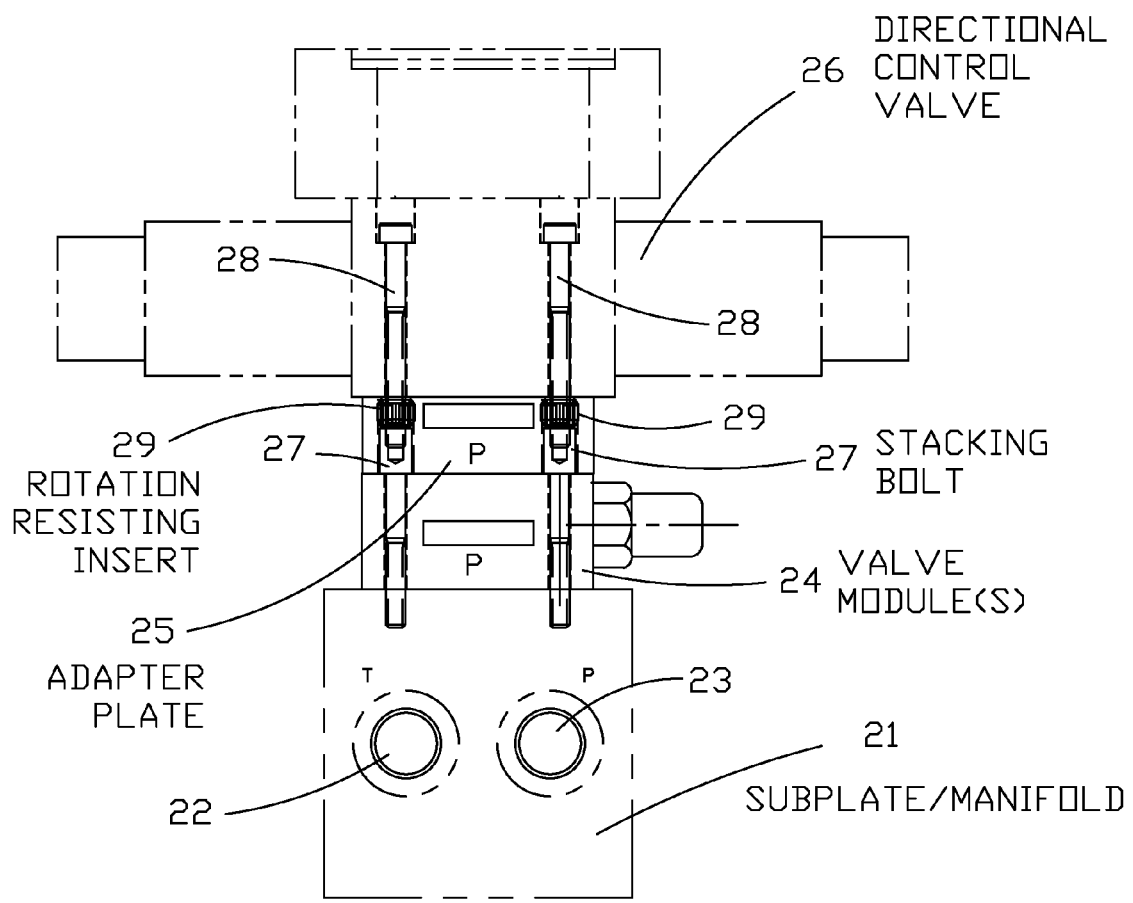
FIG. 3 provides a side elevational view of a stack of fluid components, constructed according to the present invention.
Figure 8:
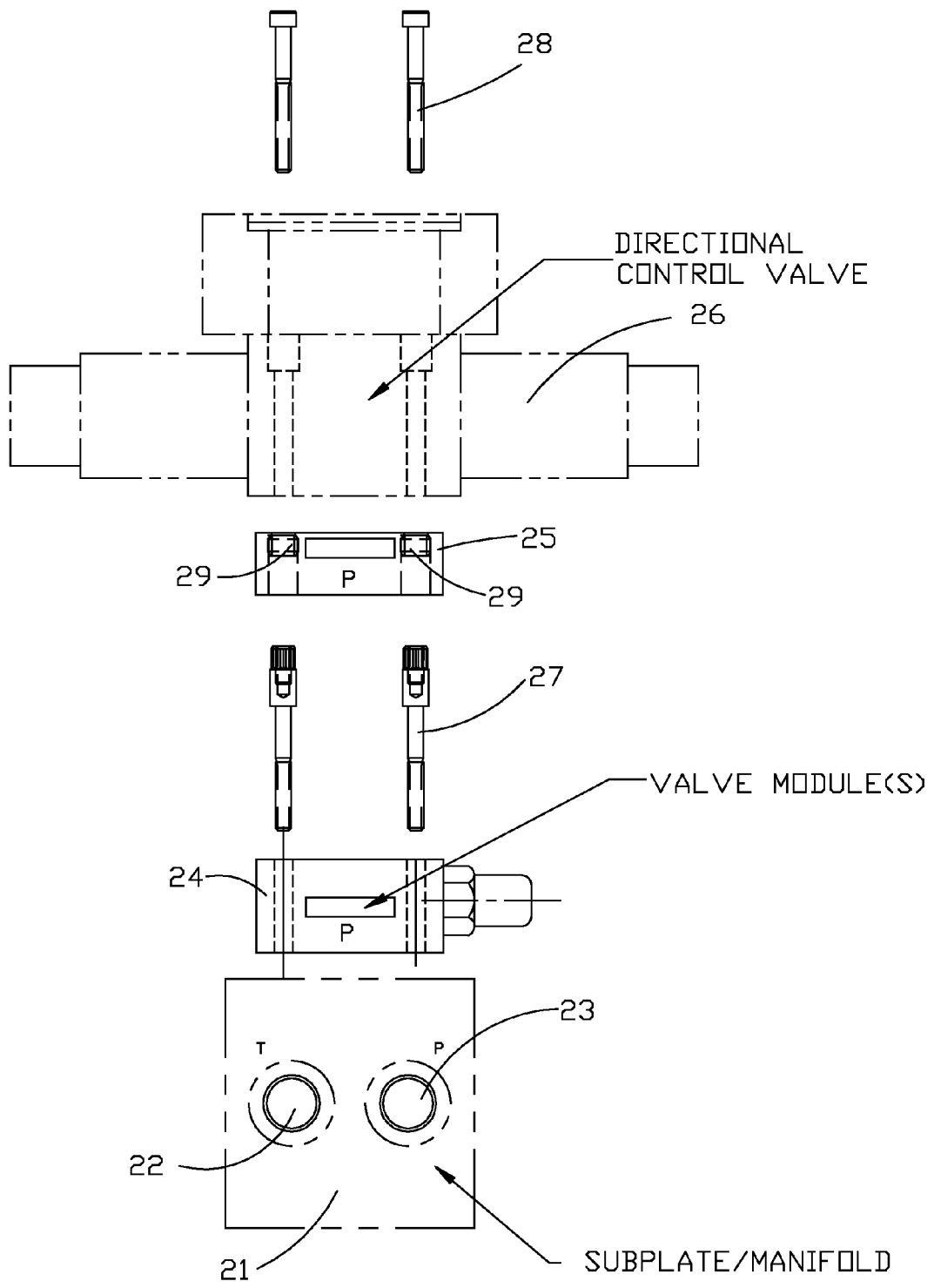
FIG. 8 provides an exploded view of a stack of fluid components, according to the present invention.
Figure 9:
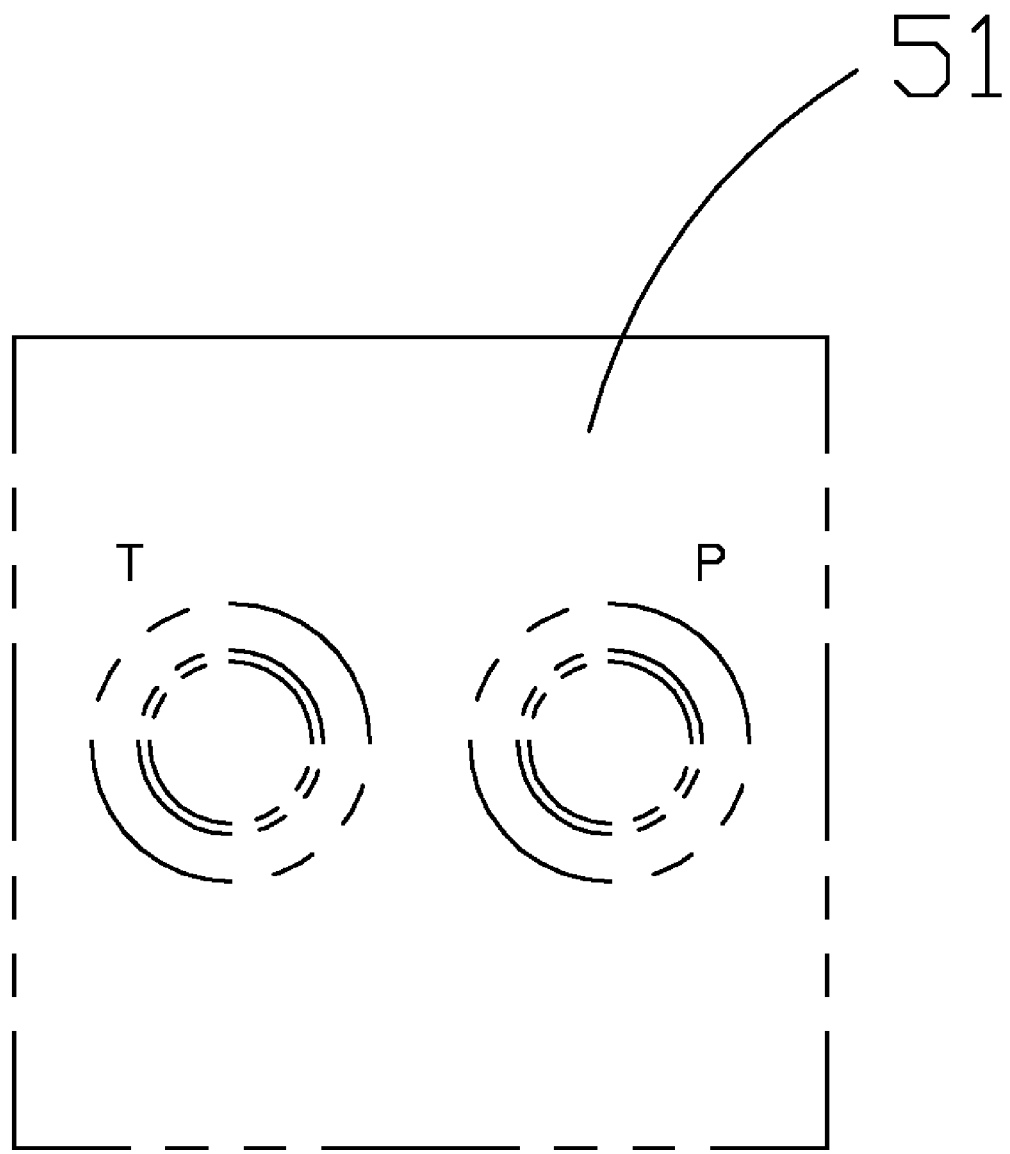
FIGS. 9-12A provide diagrams showing the sequence of an assembly process of the stack of the present invention.

A stack of fluid components, according to a representative embodiment of the present invention, is shown in FIG. 3, and in the corresponding exploded view shown in FIG. 8. At the bottom of the stack is a manifold plate 21, which is shown with ports 22 (labeled "T" for "tank") and 23 (labeled "P" for "pressure"). In the example shown, ports 22 and 23 provide fluid connections to a fluid tank and a pump. A valve module 24 is positioned above the manifold and in contact therewith. An adapter plate 25 is positioned above the valve module. A directional control valve 26 is located above the adapter plate.

A directional control valve is typically used to control the direction of movement of various components, and may be used, for example, in controlling the operation of a bulldozer or backhoe, or in controlling the operation of a flight control surface of an aircraft, or for other purposes. In general, a directional control valve directs pressurized hydraulic fluid through a selected path so that the fluid causes a specific component to move in a certain direction. In the present application, the directional control valve is used as an example of a device which can comprise a major element of a stack of fluid components. However, the invention is not limited to use with directional control valves. Such valve could be replaced by another fluid component, or by a plurality of such components. In this specification, it is understood that the term "directional control valve" is used only as an example of a fluid component which could be present in a stack.

It should also be understood that FIG. 3 shows one of many possible stacks of fluid components. Thus, valve module 24 could be replaced by a larger number of such valves. The stack could have a plurality of adapter plates, positioned at various locations in the stack. The present invention is intended for use in any of a large number of configurations of stacks of fluid components.

The adapter plate 25, which will be shown and described in more detail later, includes a plurality of bores which accommodate stacking bolts 27. The stacking bolts extend from within the adapter plate, passing through the valve module 24, and enter the manifold 21. The stacking bolt has a head, the exterior portion of which is typically polygonal (such as hexagonal) in shape. The head of the stacking bolt has a hollowed area which is provided with threads, so as to accommodate a fastening bolt 28 which is screwed into the head of the stacking bolt. Typically, the fastening bolt is supplied with the component being assembled into the stack, such as the directional control valve. A resilient annular insert 29 is installed around the exterior of the head of the stacking bolt, and is therefore located between the head of the stacking bolt and the bore of the adapter plate. The insert is used to resist rotation of the stacking bolt, when the fastening bolt above it is turned. The insert is preferably made of a deformable material such as nylon or polyethylene. The adapter plate has a superior surface 46 and an inferior surface 47, these surfaces being generally parallel to each other. The superior and inferior surfaces of the adapter plate are preferably made to be compatible with a standard hydraulic valve-mounting interface, so that the directional control valve, or other component, which has a standard configuration of ports, will fit with this interface.

Figure 4A:
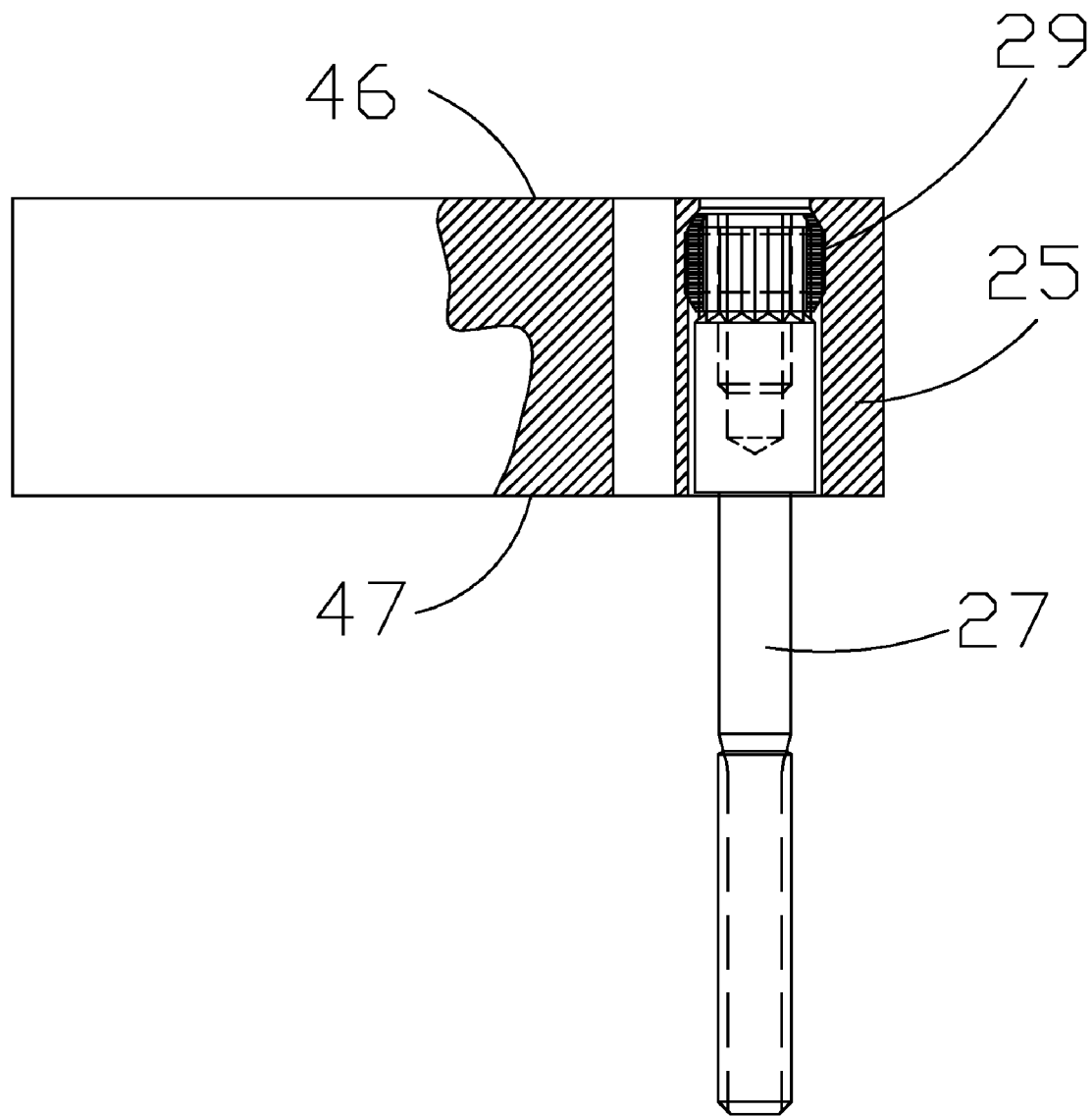
FIG. 4A provides a more detailed, cross-sectional view of the adapter plate shown in FIG. 3, the figure showing a stacking bolt and a rotation-resisting resilient insert affixed to the bolt.
Figure 4B:
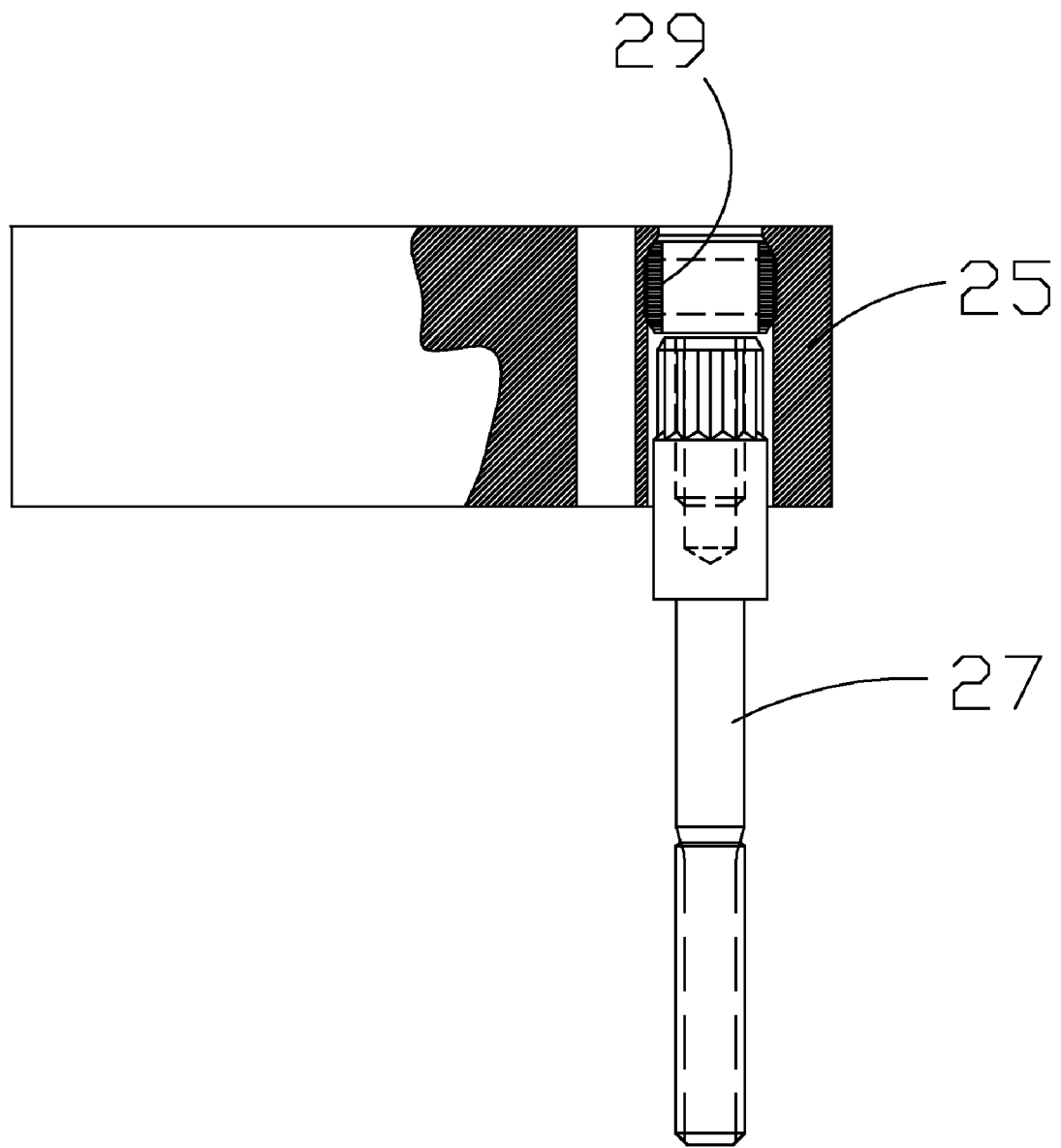
FIG. 4B provides a view similar to that of FIG. 4A, but wherein the stacking bolt is not yet engaged with the resilient insert.
Figure 4C:
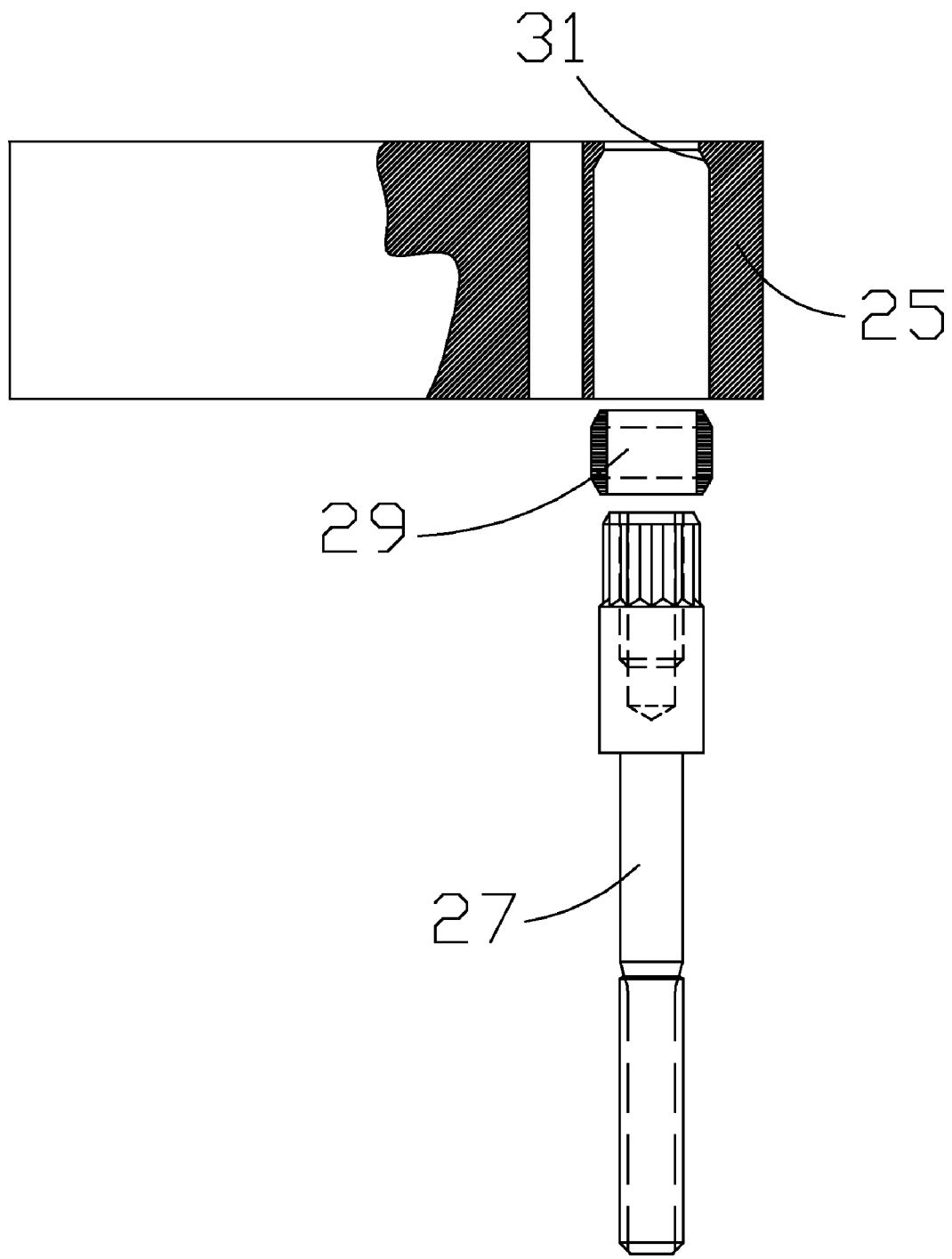
FIG. 4C provides a view similar to those of FIGS. 4A and 4B, but wherein the components are shown in an exploded configuration.

FIGS. 4A-4C provide detailed, cross-sectional views of the adapter plate, stacking bolt, and resilient insert. FIG. 4A shows an assembly of the stacking bolt 27, the adapter plate 25, and the rotation resisting insert 29. FIG. 4B shows the stacking bolt 27 separate from the assembly comprising the adapter plate 25 and the rotation resisting insert 29. This is the preferred way that these components are delivered to an end user, with the insert pre-assembled into the adapter plate. FIG. 4C provides an exploded view of all three components.

An important feature of the present invention is that the bore of the adapter plate has a taper. The taper is continuous, and is plainly visible in FIG. 4C, which shows tapered wall 31, but is also shown in FIGS. 4A and 4B. As shown most clearly in FIG. 4C, the taper may be provided only in the vicinity of the superior surface of the adapter plate, with the majority of the bore being of generally constant diameter. More details about the function and advantages of the tapered construction will be provided later.

The natural (i.e. undeformed) outside diameter of the insert 29 is slightly larger than the inside diameter of the bore of the adapter plate 25. The insert 29 is pressed into the bore until it is stopped by the taper in the bore. The interference between the insert and the bore holds the insert, by friction, within the bore both axially and radially.

The outside diameter of the head of the stacking bolt is larger than the inside diameter of the insert. Therefore, when the stacking bolt is driven into the rotation-resisting insert, the insert material is deformed around the vertices of the polygonal head, and resists rotation of the stacking bolt. Engaging the bolts of the component above provides the force required to drive the polygonal head of the stacking bolt into the rotation resisting insert.

Figure 7:
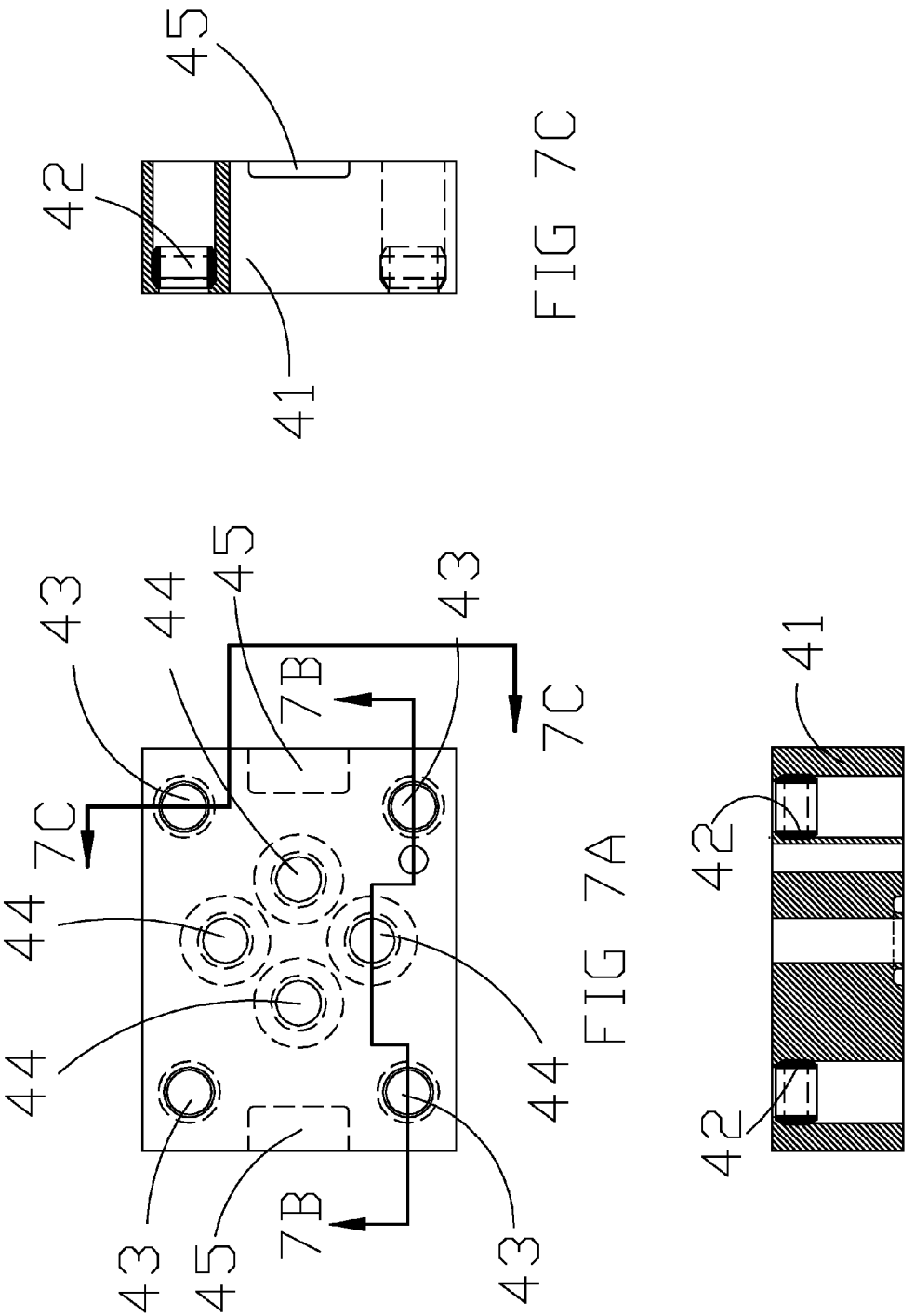
FIGS. 7A, 7B, and 7C show a top view, and cross-sectional views taken from the side and the end, of the adapter plate of the present invention.

FIGS. 7A-7C show an adapter plate 41 with its associated rotation resisting inserts 42 assembled within as the end user receives it. The adapter plate includes a bolt hole configuration which corresponds to an appropriate industry standard. In particular, holes 43 are used for mounting the adapter plate to adjacent components, and holes 44 comprise fluid port holes for providing fluid connections between components.

FIGS. 7B and 7C show the taper at the ends of the bores, formed in the adapter plate, which bores receive the wrenching portion (i.e. the polygonal head) of a stacking bolt. The taper decreases the diameter of the hole at the superior surface of the adapter plate, so that the hole does not interfere with sealing O-rings on the adjacent component. The taper also serves a secondary purpose in that it limits axial displacement of the insert. That is, the taper prevents extrusion of the insert material above the plane defined by the superior surface of the adapter plate. Such extrusion may interfere with the seals at the component interface. This taper, and limiting of axial displacement, is also useful during assembly, as it lends itself to mechanical automation of the assembly process in the factory. The inserts may be pressed into their respective bores until they come in contact with the taper.

FIGS. 7A and 7C also show slots 45 formed near the inferior surface of the adapter plate. When the adapter plate has been jacked down to abut an opposing surface, these slots 45 define recesses into which a screwdriver, or the like, can be inserted to pry the adapter plate loose, when it is necessary to disassemble the stack. This arrangement essentially provides the leverage necessary to disengage the resilient insert from the heads of the stacking bolt heads.

The same effect could be accomplished by other means. For example, one could provide an additional threaded hole in the adapter plate, the hole being perpendicular to the superior and inferior surfaces of the plate, and one can put a small setscrew within this hole. The setscrew could then be used as a jack to pry the adapter plate away from the component beneath. Such screws are commercially available with brass or nylon tips so as not to mar the finish of the superior surface of the component(s) underneath.

Figure 10:
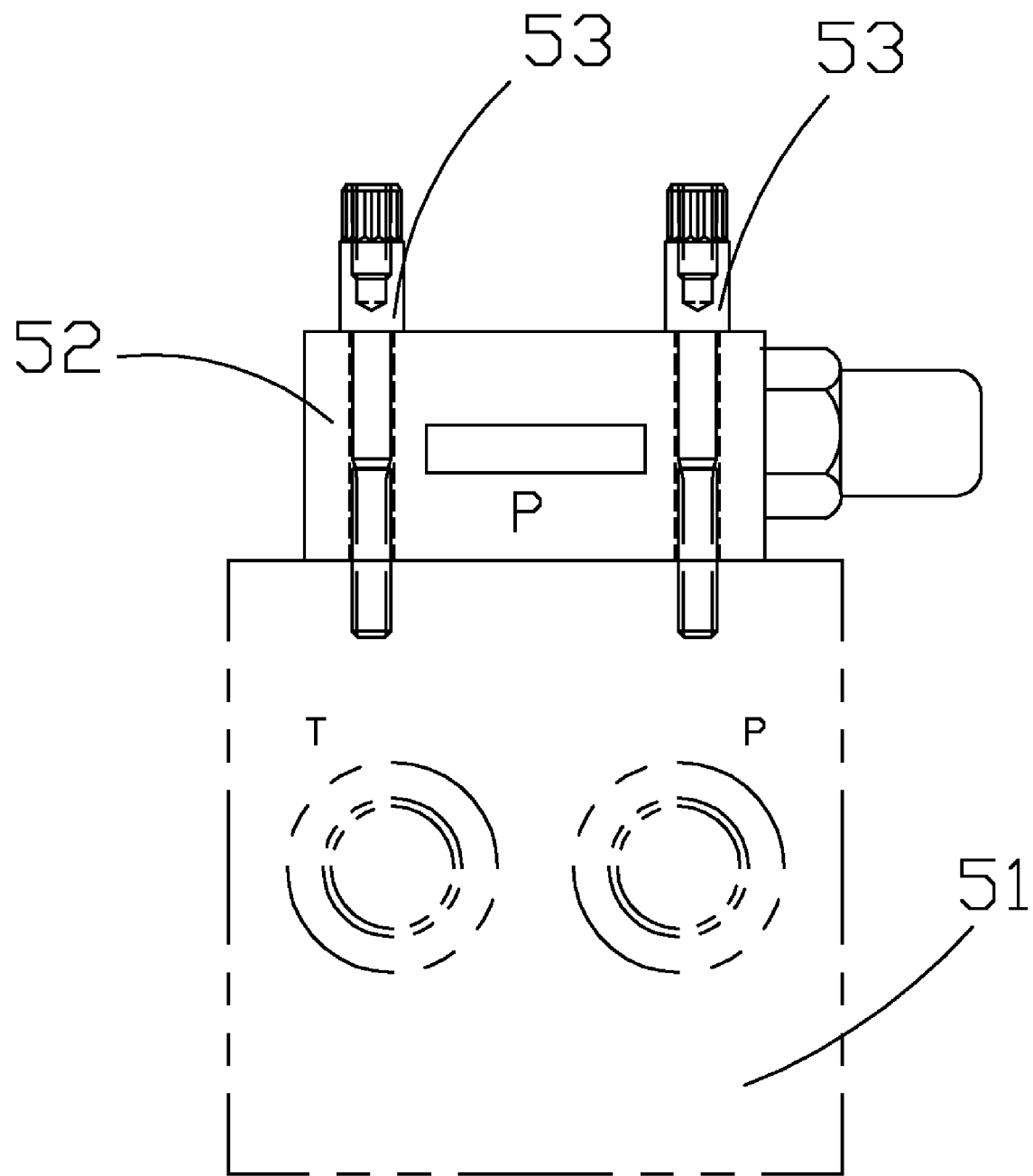

FIGS. 9-12A show the sequence of steps in the assembly of the stack of the present invention. The process begins with manifold plate 51, shown in FIG. 9, the manifold being typical for use with stacks containing a directional control valve. FIG. 10 shows the same manifold 51 with a valve element 52 held in place by means of stacking bolts 53. More than one valve element may be provided in series here. For example, two or three valve elements could be stacked on top of the appropriate station on the manifold and held in place by a set of stacking bolts.

Figure 11:
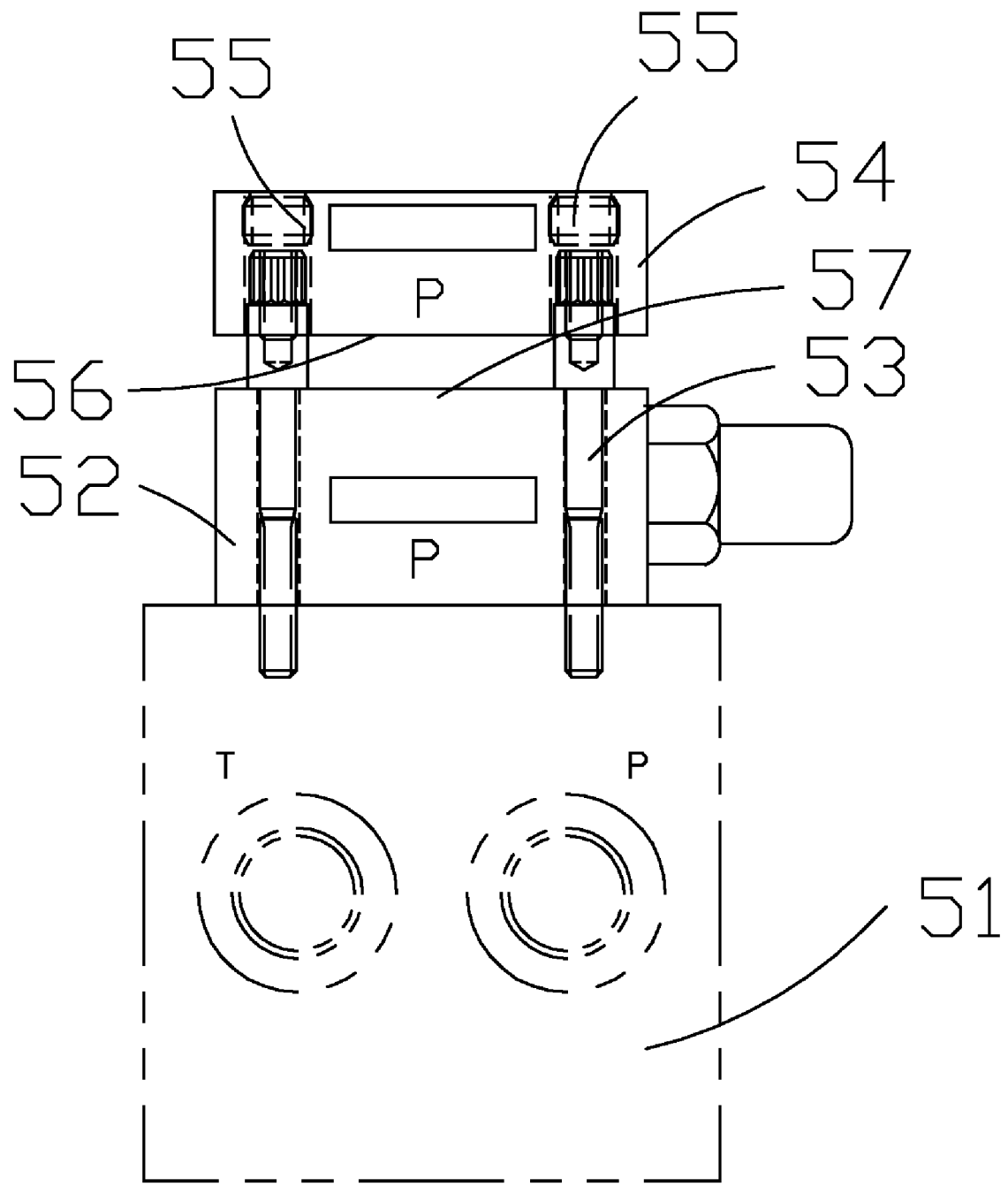

FIG. 11 shows an assembly comprising an adapter plate 54 and rotation-resisting inserts 55, placed atop the stacking bolts 53. Absent any significant axial force, the inferior surface 56 of this adapter plate will rest above the superior surface 57 of the valve element due to the interference between the inside diameter of the inserts and the outside diameter of the stacking bolts.

Figure 12:
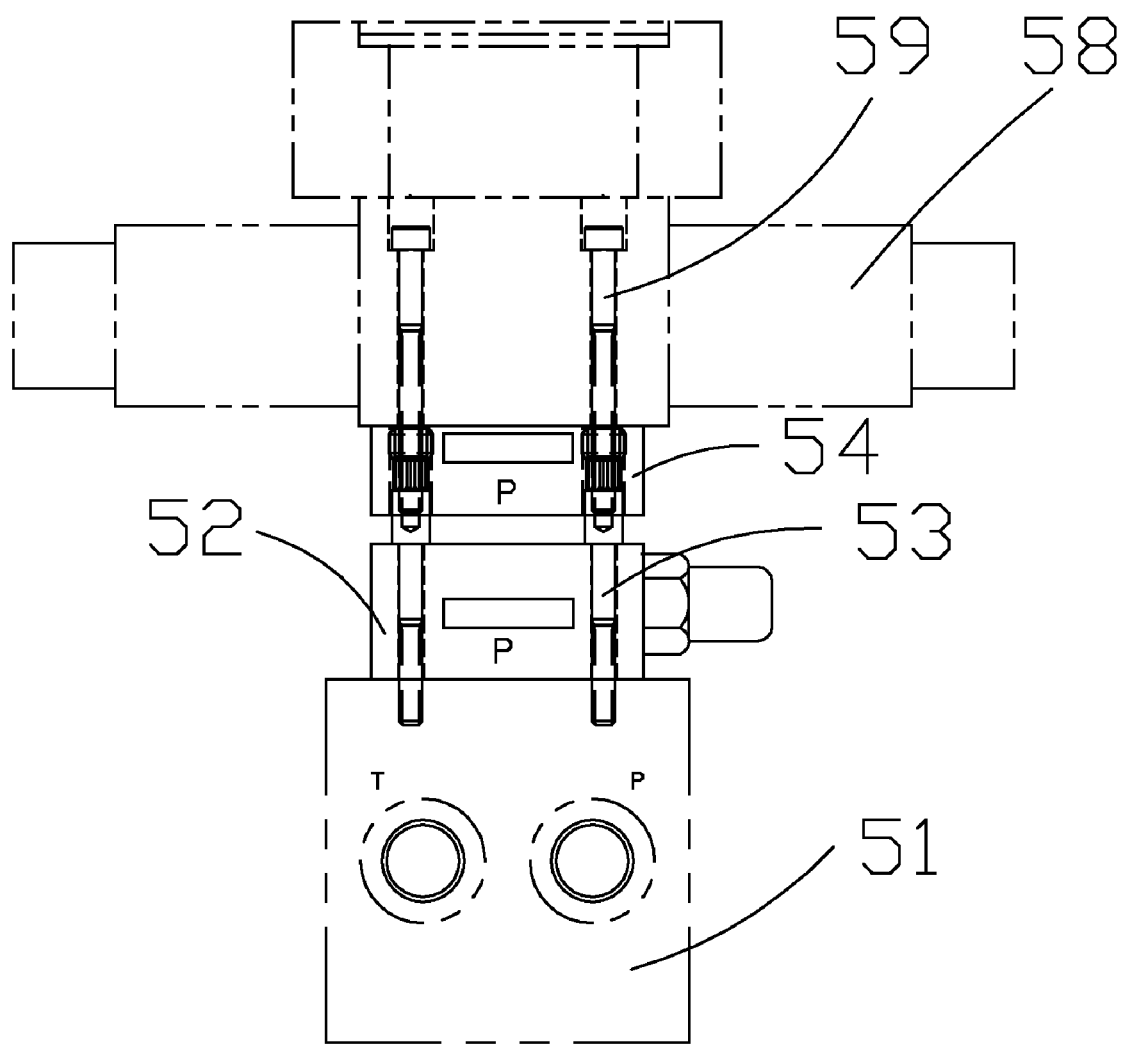
Figure 12A:
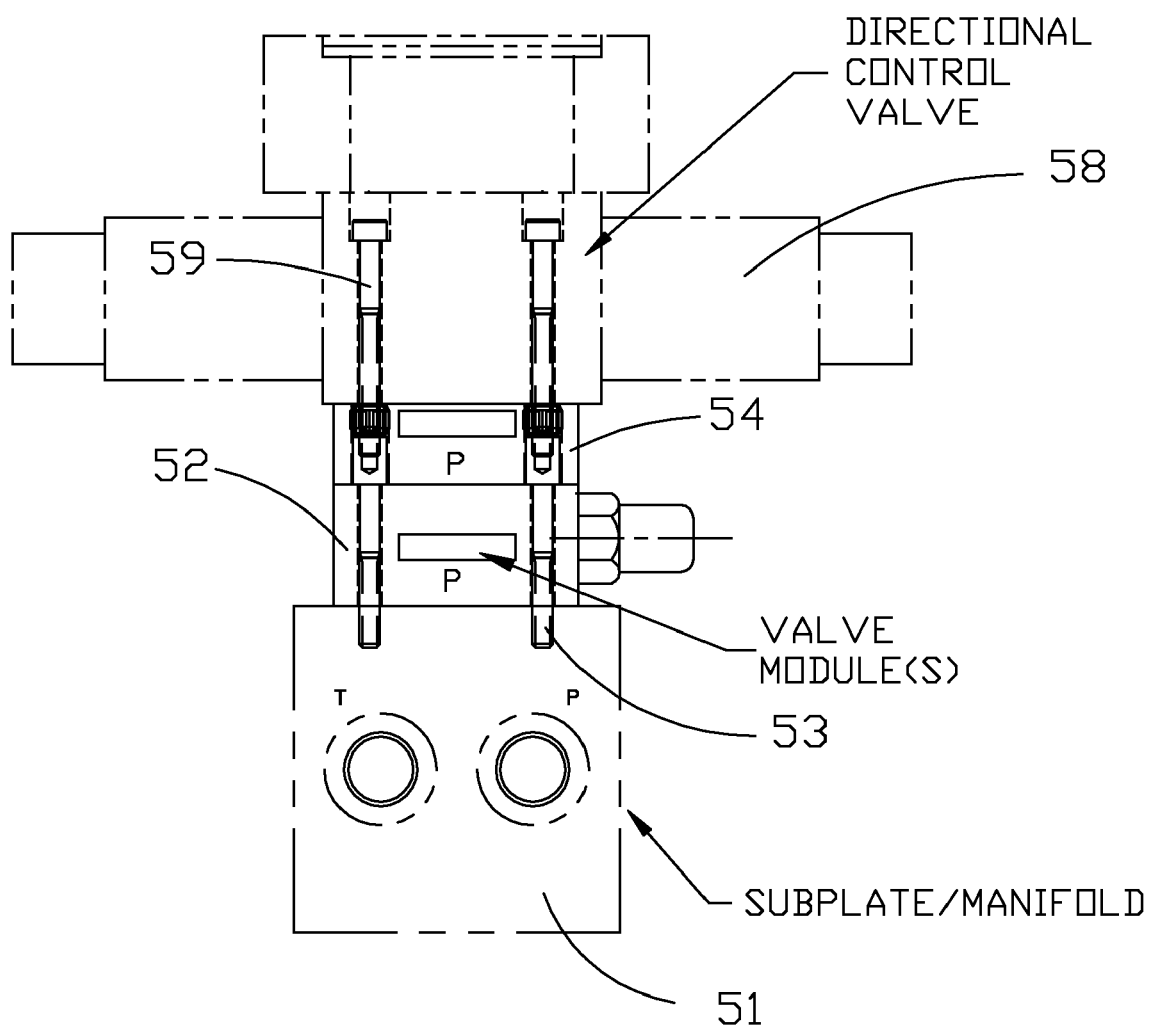

FIG. 12 shows the addition of a directional control valve 58 and engagement of its associated bolts, including fastening bolts 59. Full engagement of the bolts will result in the axial force necessary to deform the insert material around the head of the stacking bolt 53, and to bring the adapter plate 54 and valve element 52 into direct contact. In FIG. 12A, the bolts have been fully engaged, and the components are in complete sealing abutment.

Figure 13:
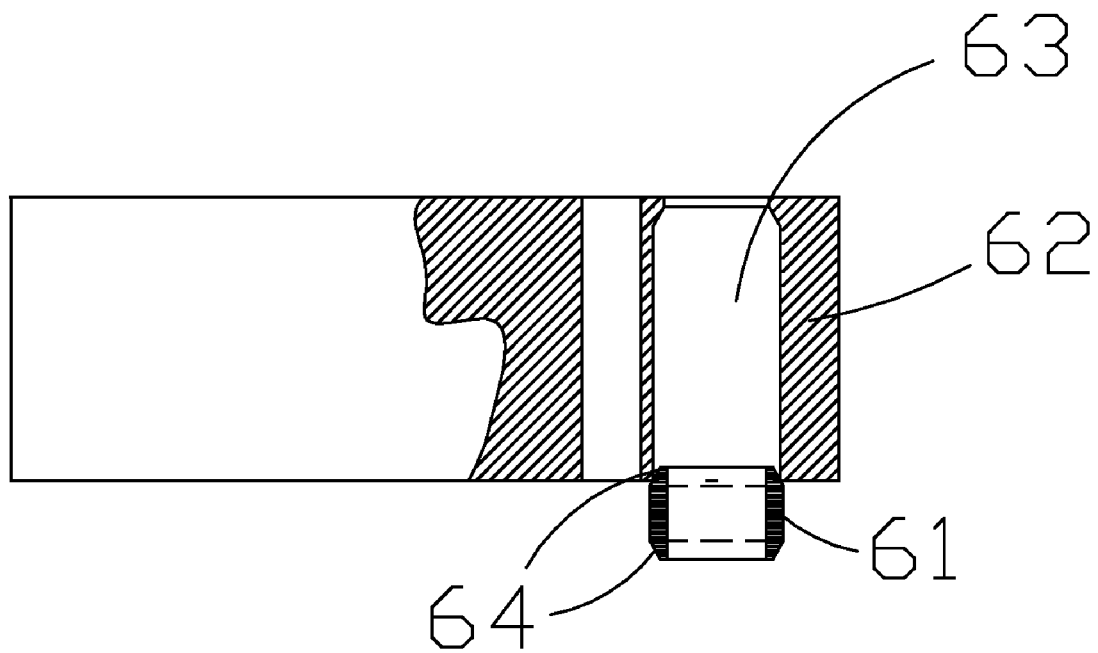
FIG. 13 provides a cross-sectional view showing the relationship between the rotation resisting insert and the bore in the adapter plate into which the insert is to be pressed.

The cross-sectional view of FIG. 13 shows the relative diameters of the rotation resisting insert 61 and the bore 63 of the adapter plate 62. The insert is to be pressed into bore 63. The figure shows the desirability of a chamfer 64 at the leading edge of the insert, to facilitate introduction into the bore. The chamfer is provided on all corners of the insert, as shown, so that the insert can be installed in the bore of the adapter plate, without taking its orientation into account.

Figure 13A:
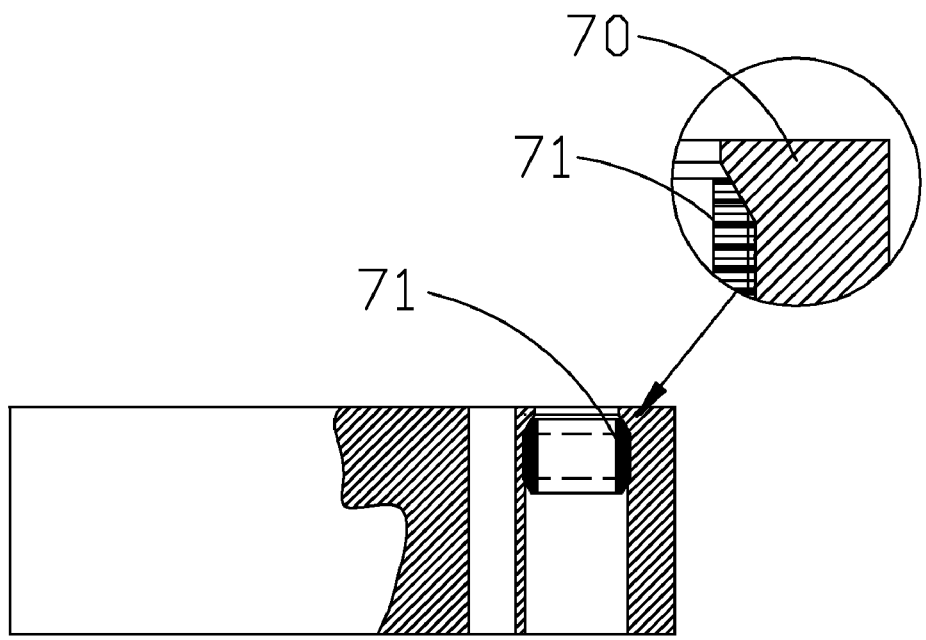
FIG. 13A provides a cross-sectional view, and a detailed cross-sectional view, of the adapter plate of the present invention, showing a tapered bore.

FIG. 13A shows a cross-sectional view similar to that of FIG. 13, but showing the insert fully installed within the bore. FIG. 13A also contains a detail, illustrating more clearly the taper of the bore. Specifically, the detail shows tapered surface 70 of the bore of the adapter plate, the tapered surface generally mating with the chamfered portion of the insert 71. That is, the tapered surface makes an angle, relative to the longitudinal axis of the bore, which is the same, or approximately the same, as the angle made by the chamfered surface relative to the longitudinal axis of the insert.

Note also that, in the preferred embodiment shown in FIGS. 13 and 13A, most of the bore has a constant diameter, and the taper is present only in a small portion of the bore, near the superior surface of the adapter plate. The invention is not limited to this structure; the taper could occupy a greater proportion of the bore than what is shown in the figures, if desired.

Figure 13B:
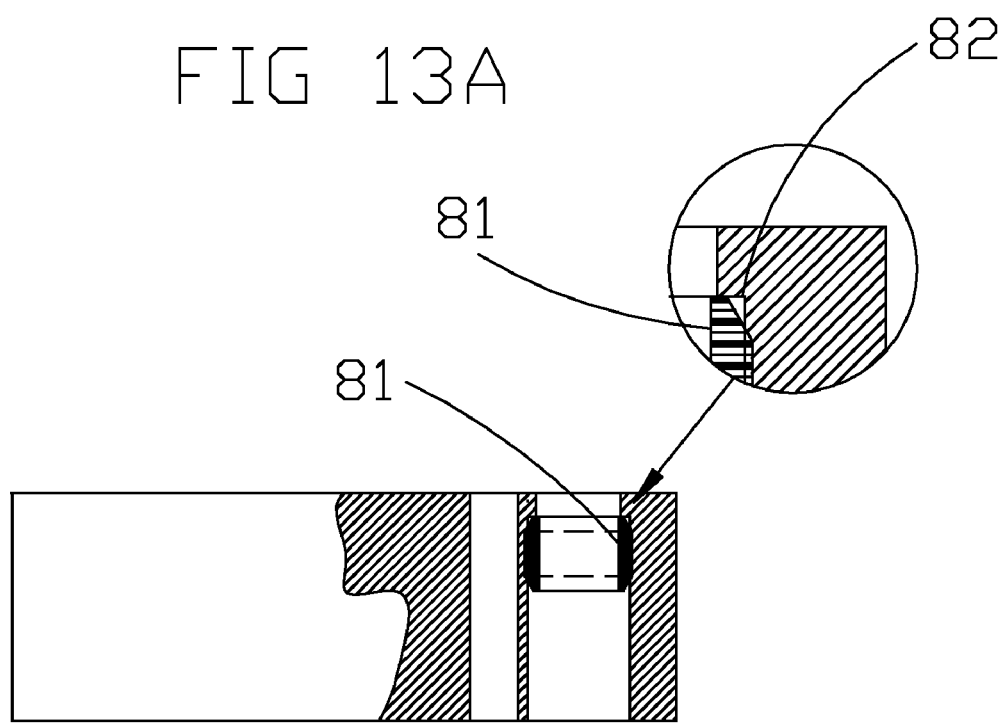
FIG. 13B provides a cross-sectional and detailed cross-sectional view similar to FIG. 13A, but showing a stepped bore.

FIG. 13B shows an alternative embodiment, in which the bore of the adapter plate is stepped and not tapered. FIG. 13B shows step 82 which contacts insert 81. This embodiment has some advantages over the prior art, but is far less advantageous than the tapered embodiment, as will be discussed later.

One advantage of the tapered construction of the bore of the adapter plate is that it effectively reduces the diameter of the hole associated with the bore, on the superior (upper) surface of the adapter plate. This reduction in diameter enables the present invention to be used with standard port configurations, but without interference between components. This feature is illustrated by FIGS. 1, 2, 5, and 6.

Figure 1:
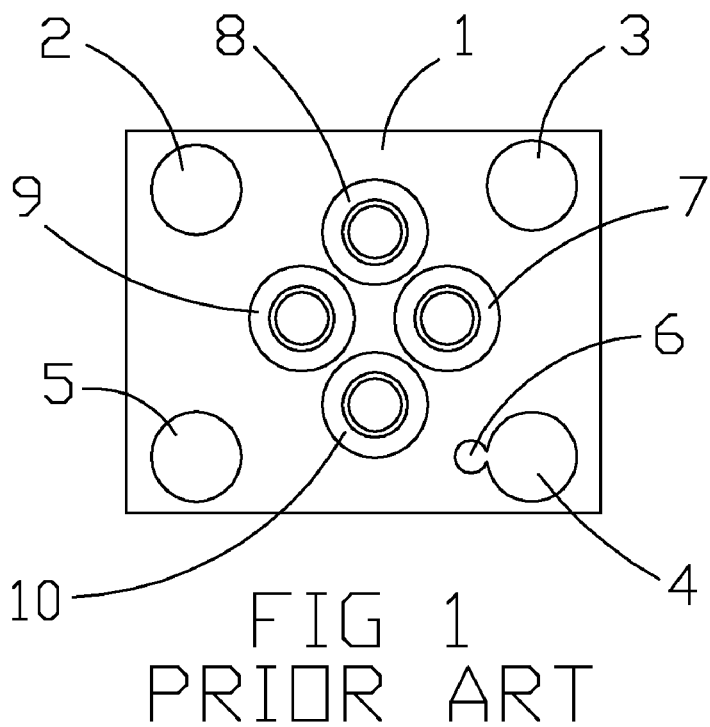
FIG. 1 provides a diagram representing a pattern of fluid ports and mounting holes, according to an industry standard, when used in connection with a stacking arrangement of the prior art.

FIG. 1 shows a standard valve-mounting interface 1, known in the industry by the designation "D03", representing an ANSI standard. This figure does not represent one component, per se, but comprises a pattern of bolt and port holes which would be present at an interface in a stack of fluid components. Holes 2, 3, 4, and 5 comprise bolt holes, i.e. holes used for mounting a fluid component to an adjacent component. These holes therefore correspond to the stacking bolts used in a fluid component stack, and to the bores of the adapter plate. Holes 7, 8, 9, and 10 are fluid port holes, i.e. holes which allow fluids to flow from one component to the next. Hole 6 represents the position of a locating pin, which may be provided with one of the fluid components. For example, many fluid components with symmetrical or mirror-image fluid bore patterns (such as the pattern labeled D03) have a locating pin to prevent them from being installed incorrectly. A directional control valve, with a D03 pattern in particular, normally has a locating pin extending from its inferior surface. FIG. 1, in the latter example, represents fluid ports at the interface between the inferior surface of the directional control valve, and the superior surface of the adapter plate.

FIG. 1 illustrates the fact that, in the prior art, the locating pin, represented by hole 6, is tangent to, and may interfere with, one of the stacking bolts, represented by hole 4.

Figure 5:
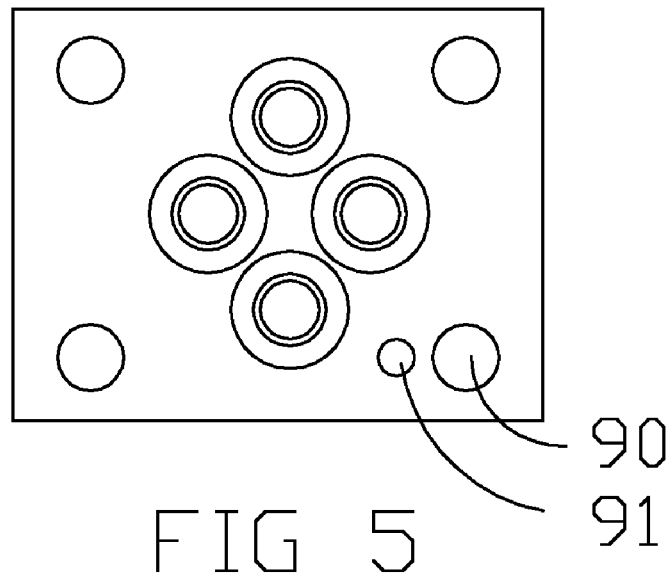
FIG. 5 provides a diagram analogous to that of FIG. 1, but wherein the diameters of the mounting holes on the superior surface of an adapter plate have been reduced, in accordance with the present invention.

FIG. 5 illustrates the corresponding pattern achieved as a result of using the present invention. The only difference between FIG. 1 and FIG. 5 is that the mounting holes, such as hole 90, have a smaller diameter than the corresponding holes of FIG. 1. This smaller diameter is a consequence of the tapered bore in the adapter plate. Because the mounting holes are smaller, there is space between hole 90 and hole 91, pertaining to a locating pin, and the components mounted in these holes are unlikely to interfere with each other.

Figure 2:
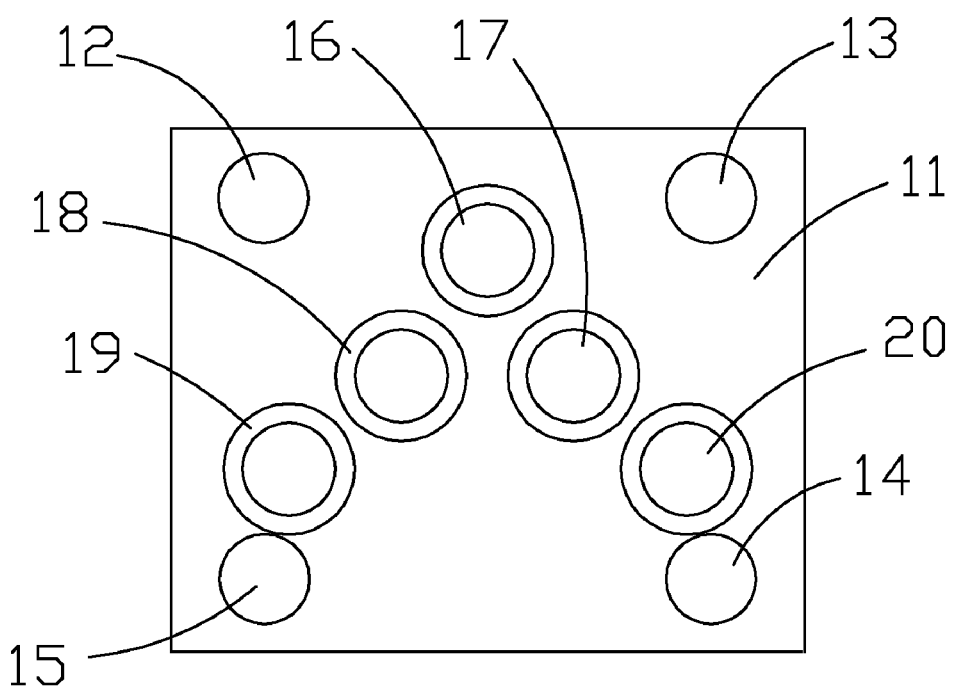
FIG. 2 provides another diagram, similar to that of FIG. 1, representing another pattern of fluid ports and mounting holes, according to another industry standard, as used with a stacking arrangement of the prior art.
Figure 6:
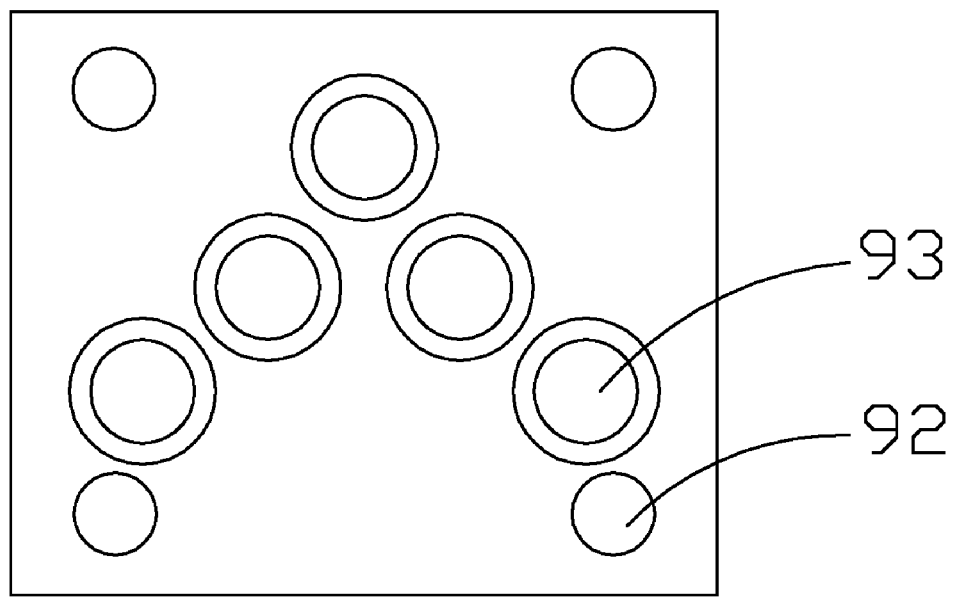
FIG. 6 provides a diagram analogous to that of FIG. 2, but wherein the diameters of the mounting holes on the superior surface of an adapter plate have been reduced, in accordance with the present invention.

FIGS. 2 and 6 illustrate a similar principle for another standard bolt and port pattern, namely the ANSI standard known as "D05". In this example, the standard bolt pattern includes mounting holes 12, 13, 14, and 15, corresponding to stacking bolts, and fluid port holes 16, 17, 18, 19, and 20. FIG. 2 shows that bolt hole 15 may interfere with fluid port hole 19, and bolt hole 14 may interfere with fluid port hole 20.

But in FIG. 6, which shows the result of the present invention, the bolt holes are smaller, due to the reduction in diameter achieved by the tapered adapter plate, and there is no longer interference between components mounted in these holes. Specifically, there is no interference between bolt hole 92 and fluid port hole 93.

Thus, in FIGS. 1 and 2, there is an unacceptably small clearance between the stacking bolt bore on the superior surface of the adapter plate, and structures associated with the adjacent component. In FIGS. 5 and 6, the clearance is larger, and sufficiently large to avoid interference. In the case of FIG. 2, the interference may occur between the stacking bolt and the O-ring cavity on the inferior surface of the directional control valve. There is a risk of overlap, leakage, and seal extrusion in light of manufacturing tolerances.

The above discussion addresses only the interface between the superior surface of the adapter plate and the inferior surface of the directional control valve, or other fluid component, above it. However, the bore of the adapter plate is not tapered towards its inferior surface. It turns out that any problem of interference at the inferior surface can be addressed conveniently in a different way. Specifically, any O-ring seals, with their respective cavities on the inferior surface of the adapter plate, can be made smaller than those present on the control valve adjacent to the superior surface, so that they do not interfere with the bore for the rotational insert. The superior surface of the adapter plate must be made to be compatible with the large quantity of directional control valves manufactured today. But the inferior surface, being a part of the adapter plate, need not have a pattern which is identical to the standard configuration.

Thus, for example, to avoid interference at the inferior surface of the adapter plate, one could simply make the diameter of an O-ring slightly smaller. Or one could move the position of the hole, in the adapter plate very slightly, to avoid interference while still maintaining the desired fluid communication. Such modifications could not conveniently be used at the superior surface because of the need to accommodate fluid components manufactured by others according to an industry standard.

The assembly of the fluid component stack of the present invention may be summarized as follows.

The stacking bolts are engaged and wrenched to fix the fluid component(s) beneath them. The adapter plate, containing the resilient inserts, is placed over the bolt heads. Due to the interference between the inside diameter of the inserts, and the normally polygonal heads of the stacking bolts, the adapter plate will be held offset from the component below, absent any axial force from above that would deform the insert around the head of the stacking bolt.

The component above is then placed onto the superior surface of the adapter plate, and its bolts are entered into threaded engagement with the stacking bolts below. This operation drives the adapter plate downward as the rotation resisting inserts are deformed about the heads of the stacking bolts. While the fastening bolts are being tightened into the heads of the stacking bolts, the taper of the bores in the adapter plate prevents upward displacement of the insert with respect to the adapter plate. The bolts of the final component are wrenched until the inferior surface of the adapter plate is in contact with the corresponding surface of the component beneath it, and an appropriate torque is applied to the bolts.

In the above-described assembly, the superior component may be disassembled without concern that the stacking bolt beneath it may become loosened. The adapter plate and inserts are engaged with their corresponding stacking bolts. These bolts are then provided with resistance to loosening, whereas the bolts above are not. This would be true if multiple stacking bolts/adapter plate combinations were used in series. In order for a wrench to engage the head of the stacking bolt, the adapter plate/inserts must be removed, thereby exposing the head of the bolt. (This may be accomplished by providing a pair of slots at the periphery of the inferior surface of the adapter plate into which a screwdriver or the like may be inserted to pry the adapter and insert assembly off of the stacking bolts). Any stacking bolts beneath these in series will still be engaged with their respective stacking bolt and inserts. Therefore, it will be the last set of stacking bolts in a series that will loosen.

It is strongly preferred that the bore of the adapter plate be tapered, rather than stepped. The rotation-resisting insert, in its preferred embodiment, is provided with a chamfer to allow it to more easily be introduced into the bore in the adapter plate. As the outside diameter of the insert is greater than the inside diameter of the bore, it is necessary to use a press to assemble the insert into the bore. The insert is pressed into the bore until it reaches the taper or step. In the case of the stepped bore, the insert comes in contact with the step only along a small portion at the periphery of its inside diameter (see FIG. 13B). This results in almost point loading of the cantilevered section at the maximum distance away from the wall of the bore, and results in maximum bending stress at the root of the cantilevered section. Also, the force is distributed across a small area of the insert, and may result in yielding, or coining of the material, with the possibility of extrusion above the plane of the superior surface of the adapter plate, or extrusion into the ID. Extrusion above the plane of the superior surface can interfere with apposition of the superior surface of the adapter plate and the inferior surface of the directional control valve, and result in leakage. Extrusion into the ID can result in interference with the female threaded portion of the stacking bolt, and prevent engagement of the bolts of the directional control valve.

If a step were used, as illustrated in FIG. 13B and its detailed view, it would be desirable to make the step thick enough that it does not shear off during tightening of the bolts, but thin enough so as to minimize the distance between the top of the stacking bolt and the component above. With the tapered construction, as shown in FIG. 13A, the insert can be wedged almost all the way to the superior surface of the adapter plate.

In short, when the insert reaches the tapered section of the bore, the insert is in contact with the taper along the entire tapered section (see FIG. 13A). This even distribution of the load results in a lower bending moment at the root of the cantilevered section. Also, the insert is in contact with the tapered section of the bore over a larger area, reducing the possibility of insert yielding or coining.

Finally, the incline of the taper provides increased radial force on the stacking bolt during assembly. As the stacking bolt is driven into the insert, any slight upward axial movement of the insert results in a slight decrease in the ID of the insert at its superior aspect, with a resultant increase in radial force at the interface of the stacking bolt and insert. This of course results in higher resistance to rotation of the stacking bolt within the insert/adapter plate assembly.

Also, as the thickness of the taper at the outside diameter of the stacking bolt is less than that of the stepped bore (for similarly stressed sections), the superior surface of the bolt is closer to the superior surface of the adapter plate in the tapered configuration. Thus, it is possible to use the standard length directional control valve bolts as jacking screws in this type of assembly.

The adapter plate and the inserts are shipped complete as one unit. This overcomes objection to shipping the inserts separately where they are at risk for loss due to misplacement. Also, assembly of the insert into the adapter plate can be done more economically at the factory, using an automated process.

The rotation-resisting insert is made with a bevel or chamfer that matches the taper of the bore. This allows the insert to be more easily started into the bore during assembly, and also allows the stacking bolt to be more closely positioned to the superior surface of the adapter plate prior to engagement of the bolt from the next component.

The insert may be cemented into the bore during assembly at the factory. Alternatively, the bore may be provided with longitudinal grooves into which the insert deforms as it is inserted into the bore. Either of these means serve to prevent the insert from rotating with respect to the bore. The inside diameter of the insert is made smaller than the outside diameter of the head of the stacking bolt. Therefore, during assembly, the head displaces the insert material and therefore the head is held in place and prevented from rotating.

The material for the insert is chosen to provide a sufficiently high modulus of elasticity to prevent the stacking bolt from rotating, while at the same time providing a material that allows a significant amount of deformation without permanent yield, so that the adapter plate and its associated inserts may be used over and over. Several materials fulfill these criteria, including certain types of nylon and polyethylene. Unfortunately, these materials also have a relatively low coefficient of friction against steel. However, it was determined experimentally that the outside diameter of the insert could be made larger than the bore so that the insert was radially compressed to a sufficient degree to provide a force between the insert and the bore adequate to overcome this low coefficient of friction.

For example, the recommended torque to tighten an oiled 10-24 socket head cap screw is 3.5 foot-pounds. This 10-24 thread is used on the D03 valve interface. The torque required to turn a stacking bolt with this thread, coupled only with a nylon insert dimensioned in the manner above, was as high as 12 foot pounds, far higher than the recommended torque for a socket head cap screw of this size. Therefore, the additional torque that will resist rotation provided by an insert held against the bore by friction alone is more than sufficient to guarantee that a stacking bolt held in this manner will not loosen before a bolt that is not so engaged.

The insert is designed so that when it is in place within the bore, the resulting inside diameter of the insert is about equal to the pitch diameter of the polygonal head of the stacking bolt that it will interface with. Therefore, the volume of material displaced by the head has an equal volume of space to flow to in the valleys between the points.

FIG. 14 shows an alternative embodiment of the invention, in which the outside diameter of the insert is essentially equal to the diameter of the bore of the adapter plate. In this embodiment, the insert is cemented or glued into the bore. FIG. 14 shows insert 73, and adapter plate 72 having a tapered bore, with the insert being affixed within the bore by adhesive bond 74.

Figure 15:
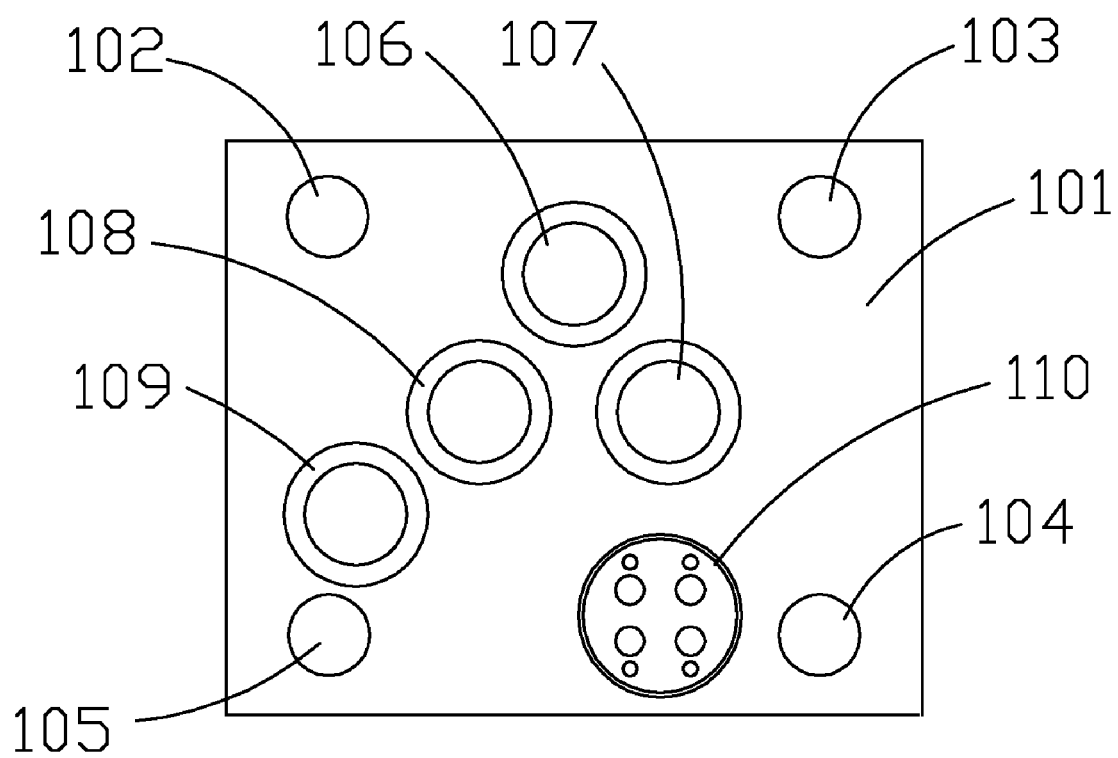
FIG. 15 provides a diagram, analogous to FIG. 6, showing the present invention as used with an assembly including hydraulic and electrical components.

FIG. 15 provides a diagram, analogous to FIG. 6, showing the invention as used in a system comprising hydraulic and electrical components. FIG. 15 shows mounting holes 102, 103, 104, and 105, and fluid port holes 106, 107, 108, and 109. The figure also includes electrical receptacle 110. As in FIG. 6, the mounting holes have a diameter which is smaller than comparable mounting holes of the prior art (as exemplified by FIG. 2), so that such holes do not interfere with the components. FIG. 15 could be generalized further to include other combinations of structural, fluid, and/or electrical components.

Figure 16:
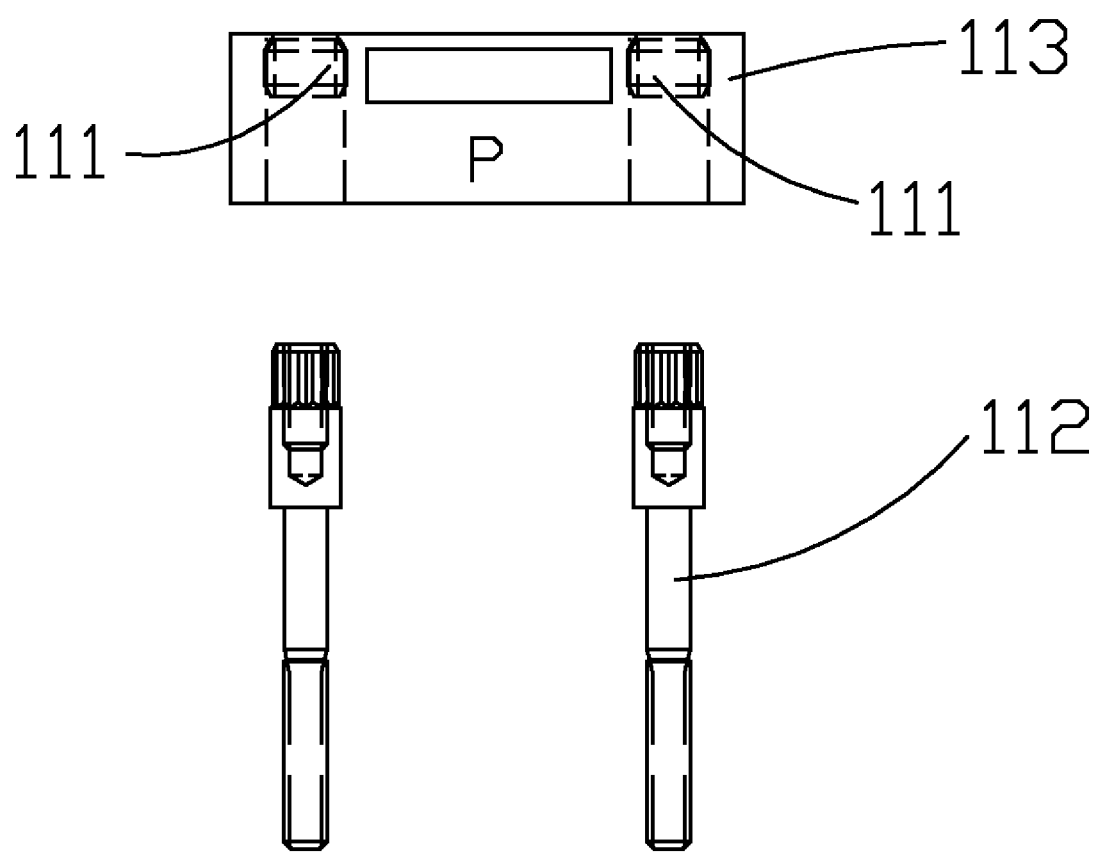
FIG. 16 provides a diagram showing the components of a stacking kit, made according to the present invention.

FIG. 16 illustrates a stacking kit made according to the present invention. The kit comprises an adapter plate 113, a plurality of resilient inserts 111 located within the bores of the adapter plate, and a plurality of stacking bolts 112. The adapter plate may also be provided with slots, similar to those shown in FIGS. 7A and 7C, to facilitate removal of the adapter plate from the stack. The insert, the stacking bolt, and the adapter plate have the structures discussed with respect to the other figures. As illustrated in FIG. 16, the thickness of the adapter plate is preferably slightly greater than the height of the head of the stacking bolt. In the example shown, the adapter plate has two bores. In practice, the number of bores can be varied, it being understood that, for each bore, there is included a resilient insert and a stacking bolt.

In some applications, the adapter plate may need to be very large. In such circumstances, it may be necessary to provide a larger number of stacking bolts than what is shown in the drawings. For example, in addition to the four stacking bolts located at or near the corners of the adapter plate, it may be appropriate to place additional stacking bolts midway along each side of the plate, or in other configurations. The present invention is intended to include these alternatives.

The invention can be modified in many other ways. As stated above, the stack of fluid components shown in the drawings is only one of a very large number of possible arrangements. The present invention is not limited to one particular stack. Also, more than one adapter plate can be used, according to the needs of a particular system. These and other modifications, which will be apparent to the reader skilled in the art, should be considered within the spirit and scope of the following claims.

What is claimed is:

1. In a stack of components, the stack including a component having a stacking bolt, the stacking bolt having a hollowed and threaded head portion, the stack including a component provided with a fastening bolt, and an adapter plate having a bore capable of receiving the stacking bolt and the fastening bolt, the fastening bolt being screwed into the head portion of the stacking bolt, the stacking bolt having a resilient insert disposed around the head portion, such that the insert is located between the head portion and the bore of the adapter plate, the adapter plate defining a superior surface and an inferior surface,
   the improvement wherein at least a portion of the bore of the adapter plate has a continuous taper such that the bore has a diameter which decreases in a direction of the superior surface of the adapter plate.

2. The improvement of claim 1, wherein the insert has a chamfered corner, wherein the chamfer generally matches the taper of the bore of the adapter plate.

3. The improvement of claim 1, wherein the bore extends completely through the adapter plate, wherein the bore communicates with a first hole at the superior surface, the first hole having a diameter, and wherein the bore communicates with a second hole at the inferior surface, the second hole having a diameter, wherein the diameter of the first hole is less than the diameter of the second hole.

4. The improvement of claim 3, wherein the adapter plate has at least two bores, wherein the adapter plate is generally rectangular, wherein the adapter plate defines four corners, and wherein the bores are positioned in a vicinity of said corners, wherein the bores comprise mounting holes for components in the stack.

5. The improvement of claim 3, wherein the adapter plate has at least four bores, wherein the adapter plate is generally rectangular, wherein the adapter plate defines four corners, and wherein the bores are positioned in a vicinity of said corners, wherein the bores comprise mounting holes for components in the stack.

6. The improvement of claim 1, wherein the insert is affixed by an adhesive to the bore of the adapter plate.

7. In an assembly of components, the assembly including a component having a stacking bolt, the stacking bolt having a hollowed and threaded head portion, the assembly including a component provided with a fastening bolt, and an adapter plate having a bore capable of receiving the stacking bolt and the fastening bolt, the fastening bolt being screwed into the head portion of the stacking bolt, the stacking bolt having a resilient insert disposed around the head portion, such that the insert is located between the head portion and the bore of the adapter plate, the adapter plate defining a superior surface and an inferior surface,
   the improvement wherein at least a portion of the bore of the adapter plate has a continuous taper, and wherein the bore has a diameter which decreases in a direction of the superior surface of the adapter plate.

8. The improvement of claim 7, wherein the insert has a chamfered corner, wherein the chamfer generally matches the taper of the bore of the adapter plate.

9. The improvement of claim 7, wherein the bore extends completely through the adapter plate, wherein the bore communicates with a first hole at the superior surface, the first hole having a diameter, and wherein the bore communicates with a second hole at the inferior surface, the second hole having a diameter, wherein the diameter of the first hole is less than the diameter of the second hole.

10. The improvement of claim 9, wherein the adapter plate has at least two bores, wherein the adapter plate is generally rectangular, wherein the adapter plate defines four corners, and wherein the bores are positioned in a vicinity of said corners, wherein the bores comprise mounting holes for components in the assembly.

11. The improvement of claim 9, wherein the adapter plate has at least four bores, wherein the adapter plate is generally rectangular, wherein the adapter plate defines four corners, and wherein the bores are positioned in a vicinity of said corners, wherein the bores comprise mounting holes for components in the assembly.

12. The improvement of claim 7, wherein the insert has a natural outside diameter which is essentially equal to a diameter of the bore of the adapter plate, and wherein the insert is affixed to the bore by an adhesive.

13. A stack of fluid components, comprising:
   a) at least one component having a stacking bolt,
   b) the stacking bolt having a hollowed and threaded head portion,
   c) at least one fluid component having a fastening bolt,
   d) an adapter plate having a bore capable of receiving the stacking bolt and the fastening bolt, wherein the fastening bolt is screwed into the head portion of the stacking bolt, within the adapter plate, and
   e) a resilient insert disposed around the head portion of the stacking bolt, such that the insert is located between the head portion and the bore of the adapter plate, the adapter plate defining a superior surface and an inferior surface,
   wherein at least a portion of the bore of the adapter plate has a continuous taper, wherein the bore has a diameter which decreases in a direction of the superior surface of the adapter plate.

14. The stack of claim 13, wherein the insert has a chamfered corner, wherein the chamfer corresponds to the taper of the bore of the adapter plate.

15. The stack of claim 13, wherein the bore extends completely through the adapter plate, wherein the bore communicates with a first hole at the superior surface, the first hole having a diameter, and wherein the bore communicates with a second hole at the inferior surface, the second hole having a diameter, wherein the diameter of the first hole is less than the diameter of the second hole.

16. The stack of claim 15, wherein the adapter plate has at least two bores, wherein the adapter plate is generally rectangular, wherein the adapter plate defines four corners, and wherein the bores are positioned in a vicinity of said corners, wherein the bores comprise mounting holes for components in the stack.

17. The stack of claim 15, wherein the adapter plate has at least four bores, wherein the adapter plate is generally rectangular, wherein the adapter plate defines four corners, and wherein the bores are positioned in a vicinity of said corners, wherein the bores comprise mounting holes for components in the stack.

18. The stack of claim 13, wherein the insert has a natural outside diameter which is essentially equal to a diameter of the bore of the adapter plate, and wherein the insert is affixed to the bore by an adhesive.

* * * * *